(12) United States Patent
Jou et al.

(10) Patent No.: US 7,809,636 B1
(45) Date of Patent: Oct. 5, 2010

(54) SYSTEM AND METHOD FOR MULTICURRENCY AND MULTIBANK PROCESSING OVER A NON-SECURE NETWORK

(75) Inventors: Brian Jou, Rego Park, NY (US); Lynn A. Adler, Harvard, MA (US); Robert L. Bing, Hewlett, NY (US); James M. Boyle, Hicksville, NY (US); Clare K. Briody, New York, NY (US); Ian K. Emery, Sevenoaks (GB); Brian A. Moran, Kingston Upon Thames (GB); Kenneth Mascio, Ronkonkoma, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/439,020

(22) Filed: Nov. 12, 1999

Related U.S. Application Data

(60) Provisional application No. 60/108,286, filed on Nov. 13, 1998.

(51) Int. Cl.
*G06Q 40/00* (2006.01)
(52) U.S. Cl. .............................. 705/39; 705/42; 705/27; 705/28; 235/380; 235/379
(58) Field of Classification Search .................... 705/39, 705/42, 27, 28; 235/380, 379
See application file for complete search history.

(56) References Cited

U.S. PATENT DOCUMENTS 3,653,480 A    4/1972    Yamamoto et al.

(Continued)

FOREIGN PATENT DOCUMENTS

EP    421808    4/1991

(Continued)

OTHER PUBLICATIONS

Japanese Office Action dated Jun. 6, 2003 (with English translation).

(Continued)

*Primary Examiner*—Daniel S Felten
(74) *Attorney, Agent, or Firm*—Hunton & Williams LLP

(57) ABSTRACT

A system and method for initiating multicurrency/multibank wire transfers and account reporting. Using a standard Internet browser, a customer of a financial institution accesses the funds transfer and information reporting system of the present invention. Access to the system is restricted based on the user's security profile and access rights. Once logged into the system, the user provides instructions to move funds from their accounts with the financial institution or funds from an account with any other financial institution. Furthermore, the customer is able to view the details of its accounts maintained at the financial institution or at any other financial institution in the same session. Wire transactions can be in the form of a pre-defined or free formatted instruction. Furthermore, the wire transactions can involve several banks and several different currencies. Once the multibank/multicurrency wire transactions are entered, they can be approved and released by the users with the appropriate security profile and access rights. Customers can retrieve balance and transaction reports from their demand deposit accounts, controlled disbursement accounts and lockbox accounts that they have with the financial institution and with other banks.

11 Claims, 26 Drawing Sheets

U.S. PATENT DOCUMENTS

| | | |
|---|---|---|
| 4,205,780 A | 6/1980 | Burns |
| 4,321,672 A | 3/1982 | Braun et al. |
| 4,396,985 A | 8/1983 | Ohara |
| 4,495,018 A | 1/1985 | Vohrer |
| 4,617,457 A | 10/1986 | Myers |
| 4,672,377 A | 6/1987 | Murphy |
| 4,700,055 A | 10/1987 | Kashkashian, Jr. |
| 4,727,243 A | 2/1988 | Savar |
| 4,752,877 A | 6/1988 | Roberts et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,931,793 A | 6/1990 | Fuhrmann et al. |
| 4,948,174 A | 8/1990 | Thomson et al. |
| 4,974,878 A | 12/1990 | Josephson |
| 4,988,849 A | 1/1991 | Sasaki |
| 4,992,646 A | 2/1991 | Collin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,198,975 A | 3/1993 | Baker et al. |
| 5,220,501 A | 6/1993 | Lawlor et al. |
| 5,225,978 A | 7/1993 | Peterson |
| 5,237,159 A | 8/1993 | Stephens |
| 5,262,942 A * | 11/1993 | Earle ............................ 364/408 |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,424,938 A * | 6/1995 | Wagner et al. ............... 364/408 |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,513,250 A | 4/1996 | McAllister |
| 5,532,464 A | 7/1996 | Josephson et al. |
| 5,544,046 A | 8/1996 | Niwa |
| 5,550,734 A | 8/1996 | Tarter |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A * | 8/1997 | Jennings et al. ............. 235/379 |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,729,594 A * | 3/1998 | Klingman ................ 379/93.12 |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,784,696 A | 7/1998 | Melnikof |
| 5,787,403 A | 7/1998 | Randle |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,883,810 A | 3/1999 | Franklin et al. |
| 5,884,288 A | 3/1999 | Chang |
| 5,897,625 A | 4/1999 | Gustin |
| 5,898,157 A | 4/1999 | Mangili et al. |
| 5,903,881 A * | 5/1999 | Schrader et al. ............... 705/42 |
| 5,910,896 A | 6/1999 | Hahn-Carlson |
| 5,910,988 A | 6/1999 | Ballard |
| 5,917,965 A | 6/1999 | Cahill et al. |
| 5,920,847 A * | 7/1999 | Kolling et al. ................ 705/40 |

| Patent No. | Date | Inventor |
|---|---|---|
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks et al. |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,029,139 A | 2/2000 | Cunningham et al. |
| 6,029,141 A * | 2/2000 | Bezos et al. ............... 705/27 |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,056 A | 11/2000 | Stinson et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,227,447 B1 | 5/2001 | Campisano |
| 6,233,566 B1 | 5/2001 | Levine et al. |
| 6,236,972 B1 | 5/2001 | Shkedy |
| 6,240,444 B1 * | 5/2001 | Fin et al. .................... 709/205 |
| 6,278,981 B1 | 8/2001 | Dembo et al. |
| 6,289,322 B1 | 9/2001 | Kitchen et al. |
| 6,301,379 B1 | 10/2001 | Thompson et al. |
| 6,304,858 B1 | 10/2001 | Mosler et al. |
| 6,321,212 B1 | 11/2001 | Lange |
| 6,338,047 B1 | 1/2002 | Wallman |
| 6,338,049 B1 | 1/2002 | Walker et al. |
| 6,374,235 B1 | 4/2002 | Chen et al. |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,490,568 B1 | 12/2002 | Omara et al. |
| 6,493,685 B1 | 12/2002 | Ensel et al. |
| 6,574,377 B1 | 6/2003 | Cahill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,704,714 B1 | 3/2004 | O'Leary et al. |
| 6,721,715 B2 | 4/2004 | Nemzow |
| 6,910,020 B2 * | 6/2005 | Oyama et al. ............... 705/38 |
| 2001/0018739 A1 | 8/2001 | Anderson et al. |
| 2001/0037309 A1 | 11/2001 | St. Vrain |
| 2001/0047334 A1 | 11/2001 | Nappe et al. |
| 2001/0047489 A1 | 11/2001 | Ito et al. |
| 2002/0012445 A1 | 1/2002 | Perry |
| 2002/0013728 A1 | 1/2002 | Wilkman |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0069134 A1 | 6/2002 | Solomon |
| 2002/0077978 A1 | 6/2002 | O'Leary et al. |
| 2002/0087468 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0138398 A1 | 9/2002 | Kalin et al. |
| 2002/0170966 A1 | 11/2002 | Hannigan et al. |
| 2002/0178071 A1 | 11/2002 | Walker et al. |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0046218 A1 | 3/2003 | Albanese et al. |
| 2003/0097335 A1 | 5/2003 | Muskowitz et al. |
| 2003/0105641 A1 | 6/2003 | Lewis |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2004/0078328 A1 | 4/2004 | Talbert et al. |
| 2005/0033690 A1 | 2/2005 | Antognini et al. |

FOREIGN PATENT DOCUMENTS

| | | |
|---|---|---|
| EP | 1014318 | 6/2000 |
| GB | 2328 532 A * | 2/1999 |
| JP | 07-131502 | 5/1995 |
| WO | WO 91/16691 | 10/1991 |
| WO | WO 93/08545 | 4/1993 |
| WO | WO 94/28497 | 12/1994 |
| WO | 9519010 | 7/1995 |
| WO | WO 96/08783 * | 3/1996 |
| WO | WO 96/12242 A1 | 4/1996 |
| WO | WO 97/14108 | 4/1997 |
| WO | 9741498 | 11/1997 |
| WO | WO 97/41498 | 11/1997 |
| WO | WO 97/45796 | 12/1997 |

| | | |
|---|---|---|
| WO | WO 97/45814 | 12/1997 |
| WO | WO 98/09260 | 3/1998 |
| WO | WO 99/10823 | 3/1999 |
| WO | WO 99/12321 * | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Annual Report Pursuant to Sectin 13 or 15(d) of The Securities Exchange Act of 1934, Form 10-K, Intelidata Technologies Corporation, Fiscal Year Ended Dec. 31, 2001.
Blockbuster running test of a stored value card, The American Banker, Sep. 1, 1995.
CES/NaBANCO introduces stored value card technology blockbuster video is first merchant partner, Business Wire, Inc., Jan. 15, 1996.
Card Flash Daily Payment Card News, www.cardweb.com, printed Sep. 23, 2004.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Malhotra, Clearing House Enumerates e-Payments Ills, The American Banker, vol. 167, No. 154, Aug. 23, 2002.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying By Credit Card-Real World and Online, http://www.virtualschool.edu/mon/ElectronicProperty/klamond/credit, printed Jul. 8, 2005, 17 pages.
Dialog file 20, #10279554.
Du Pont's Electronic Payments, Corporate EFT Report, v9, n1, Dialog file 636, Accession No. 01066902, Jan. 11, 1989.
Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money.
Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.

* cited by examiner

FIG. 3A

| Repetitive Line: | –freeform– ▼ | | Account: | DEM | 6161100588 ▼ |
|---|---|---|---|---|---|
| Bank ID: | CHASDEFFXXX | | Account Name: | YEAR 2K TEST ACCOUNT BEING USED BY |
| Bank Line: | | | Branch: | GMT FRANKFURT GERMANY |
| Settlement Type: | ⊙ Payment  ○ Receipt | Pay Method: | TLX ▼ |

Value Date  10/23/1998   Amount: ▼   0.00

Summary | Ultimate Bene | Bene Bank | Intermediary | Payment Detail | Additional Information |

Ult Bene Id:
Ult Bene Name:                           Int Bank Name:
Ult Bene Address:                        Int Bank Address:

Bene Bank Name:
Bene Bank Address:

FIG. 3B

Summary | Ultimate Bene | Bene Bank | Intermediary | Payment Detail | Additional Information |

Ult Bene Id:
Ult Bene Name:
Ult Bene Address:

FIG. 3C

Summary | Ultimate Bene | Bene Bank | Intermediary | Payment Detail | Additional Information |

Bene Bank Name:
Bene Bank Address:

FIG. 3D

Summary | Ultimate Bene | Bene Bank | Intermediary | Payment Detail | Additional Information |

Int Bank Name:
Int Bank Address:

Correspondent Charges: ○ Remitter   ⊙ Beneficiary

360

| Summary | Ultimate Bene | Bene Bank | Intermediary | Payment Detail | Additional Information |

Payment Details: ────362

| Summary | Ultimate Bene | Bene Bank | Intermediary | Payment Detail | Additional Information | 368

Bank Information:

Cust Reference:

────366

Chase Charges: ● Remitter ○ Beneficiary ────370

FIG. 3F

Chase Workspace – Wire Initiation
Input Screen for Inter Account Transfer Transactions:

| Summary | Ultimate Bene | Bene Bank | Payment Detail | Additional Information |
Ult Bene Id:
Ult Bene Name:
Ult Bene Address:

Bene Bank Name:
Bene Bank Address:

FIG. 4A

| Summary | Ultimate Bene | Bene Bank | Payment Detail | Additional Information |
Ult Bene Id:
Ult Bene Name:
Ult Bene Address:

FIG. 4B

| Summary | Ultimate Bene | Bene Bank | Payment Detail | Additional Information |
Bene Bank Name:
Bene Bank Address:

FIG. 4C

| Summary | Ultimate Bene | Bene Bank | Payment Detail | Additional Information |
Payment Details:

FIG. 4D

| Summary | Ultimate Bene | Bene Bank | Payment Detail | Additional Information |
  Bank Information:
                                                    Cust Reference:
  Chase Charges: ● Remitter    ○ Beneficiary

FIG. 4E

Chase Workspace – Wire Initiation
Input Screen for Draft or Check Transactions:

Summary | Ultimate Bene | Payment Detail | Additional Information |
Ult Bene Id:
Ult Bene Name:
Ult Bene Address:

FIG. 5A

Summary | Ultimate Bene | Payment Detail | Additional Information |
Ult Bene Id:
Ult Bene Name:
Ult Bene Address:

FIG. 5B

Summary | Ultimate Bene | Payment Detail | Additional Information |
Payment Details:

FIG. 5C

Summary | Ultimate Bene | Payment Detail | Additional Information |
Bank Information:
Cust Reference:
Chase Charges: ● Remitter  ○ Beneficiary

FIG. 5D

Chase Workspace – Wire Initiation
Input Screen for Advice to Receive Transactions:

| Summary | Debit Account | Debit Bank |
—400
Debit Party Name:                    Debit Bank Name:
Debit Party Address:                 Debit Bank Address:

FIG. 6A

402
| Summary | Debit Account | Debit Bank |

Debit Party Name:       ————————————————— —404
Debit Party Address:    ————————————————— —406

Cust Reference:         ——————————— —408

FIG. 6B

410
| Summary | Debit Account | Debit Bank |
Debit Bank Name:     ————————————————— —412
Debit Bank Address:  ————————————————— —414

FIG. 6C

☐ Add-Wire Initiation

| Repetitive Line: | LINE90 ▶ | | Account: | USD 909000044 |
| Bank ID: | CHASGB2LXXX | | Account Name: | TESTING LONDON SYNCHING |
| Bank Line: | 0000000091 | | Branch: | CMB BOURNEMOUTH-PADS |
| Settlement Type: | ○ Payment ◉ Receipt | | Pay Method: | DD1 |

Value Date  10/23/1998    Amount: DEM    0.00

Summary | Debit Account | Debit Bank | Payment Detail | Additional Information |

Debit Account No: ACCOUNT NUMBER FOR PAYING CUST    Debit Bank Name: INTERMED BANK1
Debit Party Name: NAME FOR PAYING CUST              Debit Bank Address: INTERMED BANK2
Debit Party Address:                                                   INTERMED BANK3
                                                                        INTERMED BANK4

Save ▶  Clear  Close  Help

Summary | Debit Account | Debit Bank | Payment Detail | Additional Information |
Debit Account Number: ACCOUNT NUMBER FOR PAYING CUST
Debit Party Name: NAME FOR PAYING CUST
Debit Party Address:

Summary | Debit Account | Debit Bank | Payment Detail | Additional Information |

Debit Bank Name: INTERMED BANK1
Debit Bank Address: INTERMED BANK2
INTERMED BANK3
INTERMED BANK4

Summary | Debit Account | Debit Bank | Payment Detail | Additional Information |
Payment Details:

FIG. 7D

Chase Workspace – Wire Initiation

510

Summary | Debit Account | Debit Bank | Payment Detail | Additional Information |
Bank Information:
BANK REF INF01
BANK REF INF02

FIG. 7E

CHASE MANHATTAN BANK
BALANCE AND TRANSACTION DETAIL, CURRENT DAY
GLOBAL ELECTRONIC INFORMATION REPORT

REPORTING AT: 16:53 N.Y. TIME 02/20/1998 FOR BUSINESS DAY 02/20/1998
INTRADAY TRANSACTIONS REPORTED ARE FOR INFORMATIONAL PURPOSES ONl
---UNITED STATES---

---CHASE MANHATTAN - NY                INTRA DAY---

--US DOLLAR--

ACCOUNT NUMBER        ACCOUNT NAME
700 → 001-0-06843             TEST BTR

LAST UPDATE: 12:17 N.Y. TIME 02/20/1998

| | LEDGER<br>OPENING BALANCE | SAME DAY | NEXT DAY | 2 OR MORE DAYS |
|---|---|---|---|---|
| | 187,438.04 | 172,830.04 | 14,608.00 | |
| ---TOTAL CREDITS--- | 11 | | | |
| | 1,149,990.91 | 1,149,990.91 | | |
| 702 ---TOTAL DEBITS--- | 22 | | | |
| | 2,827,753.20 | 2,827,753.20 | | |
| ---PROJECTED BALANCE--- | | | | |
| | -1,490,324.25 | -1,504,932.25 | | |

704 → -------------------- CREDITS --------------------

AMOUNT    FDS    OUR-REF-NO    PDG    TIME    DATE 467,249.89   S    0120207349FF    FTS   11:56        S
YR REF:     O/B PNCBANK PITT
REC FR:     PNC BANK, NA MAIL CODE P2-PTPP-23-1 620 LIBERTY AVENUE
             PITTSBURGH PA 15222-2719

FIG. 9A

| | |
|---|---|
| B/O: | /0010000002321182 INTER-POWER USA, INC.,% INTERPOWER OF NEW YORK,19 BRITISH AMERICAN BOULEVARD,LATHAM,NY |
| RECGFP: | 12151157 MRNSEQ: 9712150015810946 |
| REMARK: | INTERPOWER OF NEW YORK /BNF/SEQ-971215001581/TIME/11:58 |
| NT REF#: | 1215 D3QCI21D 000946 VIA FED |

165,365.12   S   0465203349FF   FTS   12:15   S

| | |
|---|---|
| YR REF: | O/B WILM TRUST |
| REC FR: | WILMINGTON TRUST CO RODNEY SQUARE NORTH WILMINGTON DE 19890 |
| B/O: | /434902 CORP TRUST |
| RECGFP: | 12151749 MRNSEQ: 01322 |
| REMARK: | REF BARBARA PHILLIPS CHADBOURNE ANDPARKE LLP /TIME/17:48 |
| NT REF#: | 1215 C1QACI2A 000689 VIA FED |

116,451.25   S   0464701349FF   FTS   12:15   S

| | |
|---|---|
| YR REF: | O/B WILM TRUST |
| REC FR: | WILMINGTON TRUST CO RODNEY SQUARE NORTH WILMINGTON DE 19890 |
| B/O: | /434912 CORP TRUST |
| RECGFP: | 12151749 MRNSEQ: 01331 |
| REMARK: | REF BARBARA PHILLIPS CHADBOURNE PARKE LLP /TIME/17:50 |
| NT REF#: | 1215 C1QACI2A 000691VIA FED |

97,045.91   S   0462907349FF   FTS   12:15   S

| | |
|---|---|
| YR REF: | O/B WILM TRUST |
| REC FR: | WILMINGTON TRUST CO RODNEY SQUARE NORTH WILMINGTON DE 19890 |
| B/O: | /434922 CORP TRUST |
| RECGFP: | 12151750 MRNSEQ: 01333 |
| REMARK: | REF BARBARA PHILLIPS CHADBOURNE PARKE LLP /TIME/17:50 |
| NT REF#: | 1215 C1QACI2A 000693 ** VIA FED** |

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*ABBREVIATED\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

FIG. 9B

| | |
|---|---|
| REC FR: | DEUTSCHE BANK A G TAUNUSANLAGE 12 FRANKFURT GERMANY |
| B/O: | AIXTRON AG KACKERTSTR 15-17 52072 AACHEN DEUTSCHE BANK A.G. AACHEN W. GERMANY |
| RECGFP: | 12162313 |
| REMARK: | INVOICE 8024-1186 /BNF/$15.00 FEES DED |

2,050.00   S   067770034911   FTS   12:15      R

| | |
|---|---|
| YR REF: | CFE OF 97/12/15 |
| REC FR: | CHASE MANHATTAN FUNDS TRANS SAMEDAYCREDIT RETURNS 15 NEW YORK PLAZA NEW YORK NY 10015 |
| RECGFP: | 12151754 |
| REMARK: | REV OF ENTRY DD 12/15/97 TRN 01860 00349EU YR REF CFE OF 97/12/15 MORGAN GTY TR CO. ADVISES ACCOUNT IS CLOSED /BNF/OUR REF. CMB4803-15DEC97 CHASREF03591033349FF |

706 → --TOTAL CREDITS--    11

1,149,990.91      1,149,990.91

708 → ---------------------------------- DEBITS ----------------------------------

AMOUNT    FDS    OUR-REF-NO    PDG   TIME    DATE 2,746,869.23   S   0185200349EU   FTS   12:08      S

| | |
|---|---|
| YR REF: | CFE OF 97/12/15 |
| PAID TO: | CHADBOURNE & PARKE PAYROLL A-C 30 ROCKEFELLER PLAZA, SUITE 3024 NEW YORK NY 10112-3096 |
| RECGFP: | 12151225 |
| REMARK: | FOR LEGAL & NON EXEMPT YEAR END BONUS |

12,699.00   S   0187400349EU   FTS   11:59      S

| | |
|---|---|
| YR REF: | CFE OF 97/12/15 |
| PAID TO: | WEST BK BELV WESTERN BANK BELLEVUE WA |
| RECGFP: | 12151228  MRNSEQ: 00349EU01874 |
| REMARK: | /20170957140 MITCHELL STOCKS NY FOR ASSOC /TIME/12:31 |
| NT REF#: | 1215 B1QGC02C 002314    VIA FED** |

11,556.00   S   0187700349EU   FTS   11:59      S

****************************************ABBREVIATED****************************************

FIG. 9C

```
                 2,000.00   S    0186500349EU    FTS    11:59              S
YR REF:    CFE OF 97/12/15
PAID TO:   BANKERS NYC BANKERS TRUST COMPANY NEW YORK NY
RECGFP:    12151228  MRNSEQ: 00349EU01865
REMARK:    /00163053 FIDELITY GROUP OF FUNDS NY NY /0500487203309
           RICHARD LISKOV FID US GOVT R NY NY FOR FURTHER CREDIT OT
           THE TRUSTEES OF C&P RETIREMENT PLAN AND TRUST FORTHE BENEFIT
           OF R LISKOV /TIME/12:30
NT REF#:   1215 B1QGC08C  002358     VIA FED**

1,847.00   S    0187500349EU    FTS    11:59              S
YR REF:    CFE OF 97/12/15
PAID TO:   CITIBK FSB WALNUT CITIBANK FEDERAL SAVINGS BANK WALNUT
           CREEK CA
B/O:       CHADBOURNE & PARKE LLP NY
RECGFP:    12151228  MRNSEQ: 00349EU01875
REMARK:    /040008644243 BRIAN MCALLISTER NY FOR ASSOC BONUS
           /TIME/12:31
NT REF#:   1215 B1QGC08C  002361     VIA FED**

880.00   S    0186600349EU    FTS    11:59              S
YR REF:    CFE OF 97/12/15
PAID TO:   BANKBOSTON BANK OF BOSTON BOSTON MA 02105-
B/O:       CHADBOURNE & PARKE LLP NY
RECGFP:    12151228  MRNSEQ: 00349EU01866
```

**************************************ABBREVIATED**************************************

```
REMARK:    /53261544 FAFLIC BOSTON MA /GA-90687A RICHARD LISKOV NY FOR
           FURHTER CREDIT OT THE TRUSTEES OF C&P RETIREMENT PLAN AND
           TRUST FOR THE BENEFIT OF R LISKOV /TIME/12:31
NT REF#:   1215 B1QGC02C  002311     VIA FED**

---TOTAL DEBITS---       22
       710 ⤴ 2,827,753.20       2,827,753.20
```

FIG. 9D

CHASE MANHATTAN BANK
BALANCE AND TRANSACTION DETAIL, PRIOR DAY
GLOBAL ELECTRONIC INFORMATION REPORT

REPORTING AT: 16:22 N.Y. TIME 02/20/1998 FOR BUSINESS DAY 02/19/1998
---UNITED STATES---

---CHASE MANHATTAN - NY                                POSTED---

720 ---US DOLLAR---

ACCOUNT NUMBER           ACCOUNT NAME
323-2-62090              TEST

LAST UPDATE: 11:01 N.Y. TIME 02/20/1998

| LEDGER CLOSING BALANCE | SAME DAY | NEXT DAY | 2 OR MORE DAYS |
|---|---|---|---|
| 4,501.00 | | 3,865.00 | 636.00 |

---AVAILABLE BALANCES---
OPENING ON 02/20/1998                3,865.00
AVERAGE THIS MONTH                   5,166.78
PREVIOUS MONTH                      24,875.74
YEAR-TO-DATE                        17,385.66

-------------------------------- CREDITS --------------------------------

| AMOUNT | FDS | OUR-REF-NO | PDG | TIME | DATE |
|---|---|---|---|---|---|
| 57,425.17 | S | 0000100050CD | CSH | | |

CHK NO:    1650000003
REMARK:    REFERENCE NUMBER 1650000003

| 26,517.47 | S | 0000300050CD | CSH | | |

CHK NO:    1910000003
REMARK:    REFERENCE NUMBER 1910000003

FIG. 10A

```
              5,400.00    S    0000200050CD      CSH
CHK NO:   1650000003
REMARK:   REFERENCE NUMBER 1650000003

1,835.88    M    0080002098TS      D/R
0:              220.88
1:            1,087.00
2:              528.00
3:                0.00
CHK NO:   1910008263
REMARK:   DEPOSIT REFERENCE NUMBER 1910008263

733.80   M    0080002099TS      D/R
0:               91.80
1:              592.00
2:               50.00
3:                0.00
CHK NO:   1650011413
REMARK:   DEPOSIT REFERENCE NUMBER 1650011413
```

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*ABBREVIATED\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

FIG. 10B

```
0:              0.97
1:              0.00
2:             25.00
3:              0.00
CHK NO:   1650011353
REMARK:   RETURN ITEM CREDIT
          REDEPOSIT - 1650011353

--TOTAL CREDITS--    7
          91,969.65          89,656.65          1,679.00          634.00
------------------------------------- DEBITS -------------------------------------

AMOUNT       FDS     OUR-REF-NO      PDG    TIME    DATE 95,915.66     S      0029370118XF    ADT
REMARK:   STANDING INSTR  TO: 323-262384
          STANDARD ADT DEBIT 2,000.00     S      9805000287CJ    CSH
CHK NO:    1640000003
REMARK:   REFERENCE NUMBER 1640000003

850.00     S      9805000288CJ    CSH
CHK NO:    1640000003
REMARK:   REFERENCE NUMBER 1640000003
```

********************************************************ABBREVIATED********************************************************

```
--TOTAL DEBITS--    7
          99,305.65          99,305.65
```

ACCOUNT NUMBER          ACCOUNT NAME
001-0-06843             TEST BTR
LAST UPDATE: 11:01 N. Y. TIME 02/20/1998
            LEDGER
       CLOSING BALANCE    SAME DAY         NEXT DAY        2 OR MORE DAYS
            187,438.04    110,522.04       62,308.00            14,608.00
---AVAILABLE BALANCES---
OPENING ON   02/20/1998           172,830.04
AVERAGE THIS MONTH                367,185.84
PREVIOUS MONTH                    798,740.83
YEAR-TO-DATE                      634,749.96
------------------------------ CREDITS ------------------------------

AMOUNT      FDS    OUR-REF-NO     PDG    TIME    DATE 1,000,000.00   S   0805051031CL   CLS
REMARK: COMM'L LOAN CREDIT
        REPRESENTING THE FOLLOWING NOTE REBATE(S): LOAN #:
        0000090278 NOTE #: 000001

```
    0:         9,084.47
    1:        29,558.00
    2:        14,608.00
    3:            0.00
REMARK:   EXPEDITED FUNDS 45,784.65    S    0255301050FF        FTS
REMARK:   7489980219    B/O THE DAI-ICHI KANGYO BANK LTD.
          VIA: DAI-ICHI KANGYO BANK LIMITED /026004307 B/O: THE
          DAI-ICHI KANGYO BANK LTD. NEW YORK, N.Y . 10048 REF: CHASE
          NYC/CTR/BNF=CHADBOURNE & PARKE NEW YORK NY
          10112-0001/AC-000001006843 RFB=7489980219 BBI=/BNF/ATTN
          BARBARA PHILLIPS DAI ICHI KANGIMAD: 0219B1Q8661C000092

29,167.00    S    0508210885TC        ACH
REMARK:   BRN & WILLIAMSN PO/REMIT 980219
          ORIG CO NAME: BRN & WILLIAMSN    ORIG ID: 1610144470
          DESC DATE: FEB 19 CO ENTRY DESC: PO/REMIT SEC: CTX
          TRACE NO: 21000028210885 EED: 980219 IND ID:
          IND NAME: 0008CHADBOURNE AND P 12,512.78    S    0250913050FF        FTS
REMARK:   7476980219    B/O THE DAI-ICHI KANGYO BANK LTD.
          VIA: DAI-ICHI KANGYO BANK LIMITED /026004307 B/O: THE
          DAI-ICHI KANGYO BANK LTD. NEW YORK, N.Y. 10048 REF: CHASE
          NYC/CTR/BNF=CHADBOURNE & PARKE NEW YORK NY
          10112-0001/AC-000001006843 RFB=7476980219 BBI=/BNF/ATTN
          BARBARA PHILLIPS DAI ICHI KANGIMAD: 0219B1Q8661C000090
```

FIG. 10E 11,354.00      S      0304514050FF         FTS
REMARK:    O/B BK OF NYC B/O GLG BALANCED FUND
           VIA: BANK OF NEW YORK /021000018 B/O: GLG BALANCED
           FUND UNITED KINGDOM REF: CHASE NYC/CTR/BNF=CHADBOURNE &
           PARKE NEW YORK NY 10112-0001/AC-000001006843 RFB=O/B BK OF N
           YC OBI=ATTN BARBARA PHILLIPS BBI=/TIME/16:17IMAD:
           0219B1Q8153C008822

---TOTAL CREDITS---        7
           1,163,659.12          1,119,493.12              29,558.00              14,608.00
----------------------------------- DEBITS -----------------------------------------

AMOUNT        FDS      OUR-REF-NO         PDG       TIME      DATE 1,084,099.79     S     0007460253XF        ADT
REMARK:    STANDING INSTR TO: 615-525350
           STANDARD ADT DEBIT 190,500.00     S      1300049050KG        INV
REMARK:    VISTAGLBLM 223 223 1006843

34,975.14     S      0016180253XF         ADT
REMARK:    STANDING INSTR TO: 615-771769
           ADT FLOAT XFER DEBIT 27,499.94     S      6751003050WD        MTS
REMARK:    REF: CAD CK OVER LIMIT HAS BEEN ENTERED FOR COLLECTION

********************************************ABBREVIATED********************************************

FIG. 10F

```
              168.75    S    9804900214CL        CLS
REMARK:   COMMERCIAL LOAN DEBIT: A/C 3420-0000902780-969

93.75    S    9804900213CL        CLS
REMARK:   COMMERCIAL LOAN DEBIT: A/C 3420-0000902780-001

--TOTAL DEBITS--          9
       1,342,639.34            1,342,639.34
----TOTALS CHASE MANHATTAN - NY
```

US DOLLAR

| | |
|---|---:|
| CLOSING LEDGER BALANCE | 191,939.04 |
| CLOSING AVAIL BALANCE | 110,522.04 |
| CLOSING NEXT DAY BALANCE | 66,173.00 |
| CLOSING 2 OR MORE DAYS | 15,244.00 |
| TOTAL CREDITS | 1,255,628.77 |
| TOTAL AVAILABLE CREDITS | 1,209,149.77 |
| TOTAL NEXT DAY CREDITS | 31,237.00 |
| TOTAL 2 OR MORE DAY CREDITS | 15,242.00 |
| TOTAL DEBITS | 1,441,944.99 |
| TOTAL AVAILABLE DEBITS | 1,441,944.99 |
| TOTAL OPENING AVAIL BALANCE | 176,695.04 |
| AVERAGE AVAIL THIS MONTH | 372,352.62 |
| AVERAGE AVAIL PREV MONTH | 823,616.57 |
| AVERAGE AVAIL YEAR-TO-DATE | 652,135.62 |

FIG. 10G

Last Access Report 02/20/1998 00:00:00

CHASE MANHATTAN BANK
BALANCE AND TRANSACTION SUMMARY, LAST ACCESS
GLOBAL ELECTRONIC INFORMATION REPORT

REPORTING AT: 17:14 N.Y. TIME 02/20/1998 FOR BUSINESS DAY 02/20/1998
INTRADAY TRANSACTIONS REPORTED FOR INFORMATIONAL PURPOSES ONLY

---UNITED STATES---

---CHASE MANHATTAN - NY---                             INTRA DAY---

---US DOLLAR---

ACCOUNT NUMBER          ACCOUNT NAME
001-0-06843             TEST BTR
LAST UPDATE:    12:17   N.Y. TIME    02/20/1998
UPDATES SINCE LAST ACCESS AT       00:00 ON 02/20/1998

| | LEDGER | SAME DAY | NEXT DAY | 2 OR MORE DAYS |
|---|---|---|---|---|
| OPENING BALANCE | 187,438.04 | 172,830.04 | 14,608.00 | 0.00 |
| TOTAL CREDITS  11 | | 0.00 | | |
| | 1,149,990.91 | 1,149,990.91 | 0.00 | 0.00 |
| TOTAL DEBITS  22 | | | | |
| | 2,827,753.20 | 2,827,753.20 | 0.00 | 0.00 |
| ---PROJECTED BALANCE--- | | | | |
| | -1,490,324.25 | -1,504,932.25 | | |

730 { (bracket encompassing the ledger table above)

732 → ------------------------------------- CREDITS -------------------------------------

| AMOUNT | FDS | OUR-REF-NO | PDG | TIME | DATE | |
|---|---|---|---|---|---|---|
| 467,249.89 | S | 0120207349FF | FTS | 11:56 | 02/20/1998 | S |
| 165,365.12 | S | 0465203349FF | FTS | 12:15 | 02/20/1998 | S |
| 116,451.25 | S | 0464701349FF | FTS | 12:15 | 02/20/1998 | S |
| 97,045.91 | S | 0462907349FF | FTS | 12:15 | 02/20/1998 | S |
| 97,045.91 | S | 0466103349FF | FTS | 12:15 | 02/20/1998 | S |

FIG. 11A

| | | | | | | |
|---|---|---|---|---|---|---|
| 97,045.91 | S | 0466301349FF | FTS | 12:15 | 02/20/1998 | S |
| 97,045.91 | S | 0468102349FF | FTS | 12:15 | 02/20/1998 | S |
| 5,000.00 | S | 0261001349FF | FTS | 12:10 | 02/20/1998 | R |
| 3,005.01 | S | 7587800349JS | FTS | 11:32 | 02/20/1998 | S |
| 2,686.00 | S | 3383500346JS | FTS | 12:17 | 02/20/1998 | S |
| 2,050.00 | S | 0677700349II | FTS | 12:15 | 02/20/1998 | R |

---TOTAL CREDITS---
INSIDE RANGE 11
                             0.00
1,149,990.91    1,149,990.91          0.00              0.00
OUTSIDE RANGE 0
                             0.00
   0.00             0.00          0.00              0.00

------------------------------ DEBITS ------------------------------

734 →

| AMOUNT | FDS | OUR-REF-NO | PDG | TIME | DATE | |
|---|---|---|---|---|---|---|
| 2,746,869.23 | S | 0185200349EU | FTS | 12:08 | 02/20/1998 | S |
| 12,699.00 | S | 0187400349EU | FTS | 11:59 | 02/20/1998 | S |
| 11,556.00 | S | 0187700349EU | FTS | 11:59 | 02/20/1998 | S |
| 7,500.00 | S | 0187600349EU | FTS | 11:59 | 02/20/1998 | S |
| 6,552.00 | S | 0185100349EU | FTS | 11:58 | 02/20/1998 | S |
| 5,559.34 | S | 0187800349EU | FTS | 11:59 | 02/20/1998 | S |
| 5,482.87 | S | 0187300349EU | FTS | 11:59 | 02/20/1998 | S |
| 3,000.00 | S | 0186100349EU | FTS | 11:59 | 02/20/1998 | S |
| 2,488.88 | S | 0185900349EU | FTS | 12:02 | 02/20/1998 | R |
| 2,311.12 | S | 0187200349EU | FTS | 11:59 | 02/20/1998 | S |
| 2,277.76 | S | 0187100349EU | FTS | 11:59 | 02/20/1998 | S |
| 2,240.00 | S | 0186300349EU | FTS | 11:59 | 02/20/1998 | S |
| 2,240.00 | S | 0186400349EU | FTS | 11:59 | 02/20/1998 | S |
| 2,050.00 | S | 0186000349EU | FTS | 11:59 | 02/20/1998 | S |
| 2,050.00 | S | 0186200349EU | FTS | 11:59 | 02/20/1998 | S |
| 2,050.00 | S | 0186800349EU | FTS | 11:59 | 02/20/1998 | S |
| 2,050.00 | S | 0186900349EU | FTS | 11:59 | 02/20/1998 | S |
| 2,050.00 | S | 0187000349EU | FTS | 11:59 | 02/20/1998 | S |
| 2,000.00 | S | 0186500349EU | FTS | 11:59 | 02/20/1998 | S |
| 2,000.00 | S | 0186700349EU | FTS | 11:59 | 02/20/1998 | S |

FIG. 11B

|   |   |   |   |   |   |   |
|---|---|---|---|---|---|---|
| 1,847.00 | S | 0187500349EU | FTS | 11:59 | 02/20/1998 | S |
| 880.00 | S | 0186600349EU | FTS | 11:59 | 02/20/1998 | S |

---TOTAL DEBITS---
INSIDE RANGE          22
    2,827,753.20          2,827,753.20          0.00          0.00
OUTSIDE RANGE     0
    0.00          0.00          0.00          0.00

736 {

TOTALS: CHASE MANHATTAN - NY

US DOLLAR

| | |
|---|---:|
| OPENING LEDGER BALANCE | 187,438.04 |
| OPENING AVAIL BALANCE | 172,830.04 |
| OPENING NEXT DAY BALANCE | 14,608.00 |
| TOTAL CREDITS | 1,149,990.91 |
| TOTAL AVAILABLE CREDITS | 1,149,990.91 |
| TOTAL NEXT DAY CREDITS | 0.00 |
| TOTAL 2 OR MORE DAYS CREDIT | 0.00 |
| TOTAL DEBITS | 2,827,753.20 |
| TOTAL AVAILABLE DEBITS | 2,827,753.20 |
| PROJECTED LEDGER BALANCE | -1,490,324.25 |
| PROJECTED AVAILABLE BALANCE | -1,504,932.25 |

FIG. 11C

CHASE MANHATTAN BANK
BALANCE REPORT, PRIOR DAY
GLOBAL ELECTRONIC INFORMATION REPORT

REPORTING AT: 15:24 N.Y. TIME 02/20/1998 FOR BUSINESS DAY 02/19/1998
---UNITED STATES---

---CHASE MANHATTAN - NY                    POSTED---

--US DOLLAR--

ACCOUNT NUMBER              ACCOUNT NAME
613-2-58029                 CHECKS PAID
LAST UPDATE: 11.00 N.Y. TIME 02/20/1998

|  | LEDGER CLOSING BALANCE | SAME DAY | NEXT DAY | 2 OR MORE DAYS |
|---|---|---|---|---|
|  | -4,714.09 | -4,714.09 |  |  |
| TOTAL CREDITS | 0 |  |  |  |
| TOTAL DEBITS | 3 |  |  |  |
|  | 2,428.84 | 2,428.84 |  |  |

---AVAILABLE BALANCES---
OPENING ON   02/20/1998            -4,714.09
AVERAGE THIS MONTH                 35,662.20
PREVIOUS MONTH                    236,237.22
YEAR-TO-DATE                      160,018.71

FIG. 12

CHASE MANHATTAN BANK
DESCENDING DOLLAR CHECKS PAID
GLOBAL ELECTRONIC INFORMATION REPORT

---

REPORTING AT: 15:16 N.Y. TIME 02/18/1998 FOR BUSINESS DAY 12/03/1997

---UNITED STATES---

---CHASE MANHATTAN - NY                                          POSTED---
---US DOLLAR

ACCOUNT NUMBER           ACCOUNT NAME
613-2-58029                   THOMSON FINANCIAL PUBLISHING

LAST UPDATE: 00:00 N.Y. TIME 00/00/0000

| CHECK AMOUNT | CHECK NUMBER | REFERENCE NUMBER |
|---:|---:|---:|
| 1,168.38 | 10915 | 0090003324TS |
| 164.85 | 10926 | 0090003325TS |

---TOTAL CHECKS---   2
      1,333.23                 1,333.23

FIG. 13

SYSTEM AND METHOD FOR MULTICURRENCY AND MULTIBANK PROCESSING OVER A NON-SECURE NETWORK

CROSS REFERENCE TO RELATED APPLICATIONS

This application is based on and claims priority to U.S. Provisional Patent Application No. 60/108,286, filed Nov. 13, 1998, entitled SYSTEM FOR MULTICURRENCY AND MULTIBANK PROCESSING OVER A NON-SECURE NETWORK, the entire disclosure of which is hereby incorporated by reference.

FIELD OF THE INVENTION

The present invention generally relates to conducting financial transactions over the Internet and more particularly to multibank and multicurrency wire transfers and cash reporting using the Internet.

BACKGROUND OF THE INVENTION

There are a variety of conventional methods and systems by which customers of a financial institution can initiate and receive reports with respect to multibank/multicurrency transactions.

In one prior art method customers have to communicate directly with the individual banks. In all cases, the customer is required to use separate communication software and establish connection to the banks individually. This process is time consuming and cumbersome. The communication with the separate banks can be achieved in several methods. In one specific prior art method, customers manually call the bank personnel to provide transfer instructions and/or retrieve balance and transaction data on the phone.

In another prior art method, the customer uses either the bank's proprietary software or off-the-shelf communication packages to dial up the bank's mainframe systems via a terminal emulation. Using the bank's proprietary electronic banking software to download balance/transactions data from the banks and input/approve transfer instructions offline and then releasing the transactions in batches to the bank's system.

These prior art systems each suffer from several drawbacks. Extensive training and knowledge with respect to the bank's proprietary systems on the part of the customer is required. The systems are difficult to deploy and maintain and are generally not user friendly. Timeliness of feedback to the customer is a great concern as these methods are typically batch driven through mainframe processes. Furthermore, because of the reliance on software loaded at the client's location, transactions can only be processed from this client location. Each of these problems are multiplied and compounded when the customer has banking relationships with several banking institutions. The customers have to establish separate communications with each of their banks, maintain separate software packages, remember separate user id/password, deal with a variety of security devices, pay for separate software licenses required by their banks, learn to use different transaction input screens, and interface with separate transaction databases.

SUMMARY OF THE INVENTION

The present invention solves most of the problems of the prior art systems and methods by providing banking customers the ability to use the Internet to communicate with a single bank. Through the single bank, customers have the capability to manage all of their banking accounts at any banks for transaction reporting and initiation. This eliminates the need for the customers to establish separate communications with their different banks, maintain separate software packages, remember separate user id/password, deal with a variety of security devices, pay for separate software licenses required by their banks, learn to use different transaction input screens, and the inefficiency of handling separate transaction databases.

By using the Internet, customers no longer need to be concerned about keeping their software up-to-date. System changes and software upgrades can be automatically and electronically deployed to customers via the Web. Since the present invention requires very little client side software, customers can access the system anywhere given the ubiquitous presence of the Web.

Using a standard Internet browser, a customer of a financial institution can access the funds transfer and information reporting system of the present invention. Access to the system is restricted based on the user's security profile and access rights. Once logged into the system, the user can provide instructions to move funds from their accounts with the financial institution or funds from an account with any other financial institution. Furthermore, the customer is able to view the details of its accounts maintained at the financial institution or at any other financial institution in the same session.

The instruction for movement of funds (wire) is entered through a data entry screen. Wire transactions can be in the form of a pre-defined or free formatted instruction. A pre-defined instruction contains information that has been predetermined with the bank. Pre-defined instructions can be entered by using a reference (line) number. Wire transaction can also be entered free form. Furthermore, the wire transactions can involve several banks and several different currencies. Once the multibank/multicurrency wire transactions are entered, they can be approved and released by the users with the appropriate security profile and access rights.

If the wire transactions are purely intrabank (between two accounts in the same bank), the transactions are routed to the money transfer systems of the bank. If the wire instructions involve the transfer of money to another bank, the instructions (or money) are routed to the other banks.

Customers can retrieve balance and transaction reports from their demand deposit accounts, controlled disbursement accounts and lockbox accounts that they have with the financial institution and with other banks. The other banks transmit their reports to the financial institution which are then consolidated and presented in a uniform report format to the customers.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 3A illustrates a screen for adding a wire transaction;

FIG. 3B shows the details with respect to the ultimate beneficiary for an added wire transaction;

FIG. 3C depicts the details associated with the beneficiary bank for an added wire transaction;

FIG. 3D illustrates the details in regard to the intermediary bank for an added wire transaction;

FIG. 3E shows the payment details of an added wire transaction;

FIG. 3F depicts the additional details for an added wire transaction;

FIGS. 4A-4E illustrate the details required for adding an Inter Account Transfer transaction;

FIGS. 5A-5D depicts the information required for adding an Draft or Check transaction;

FIGS. 6A-6C shows the details required for adding an Advice to receive transaction;

FIGS. 7A-7E illustrate the use of a repetitive line in creating a multicurrency/multibank drawdown transaction;

FIGS. 9A-9D depict a Balance and Transactional Detail report for the current day;

FIGS. 10A-10G illustrate a Balance and Transaction Detail for the Prior day's activity, including account details for two different accounts;

FIGS. 11A-11C show Summary report listing transaction activity from the Last Access by the customer;

FIG. 12 depicts a Balance report for the Prior day; and

FIG. 13 is a report listing in descending order the posted checks to a Demand Deposit Account.

DETAILED DESCRIPTION OF THE INVENTION

The present invention consists of two significant functional capabilities offered to the customers of a financial institution (a bank). The first function is multibank/multicurrency wire transaction capability and the second function is a cash reporting function capability. One unique aspect of the present invention is that it enables each of the these distinct functions to be accessed and used by a customer through a single uniform interface over the public Internet.

Figure 1:
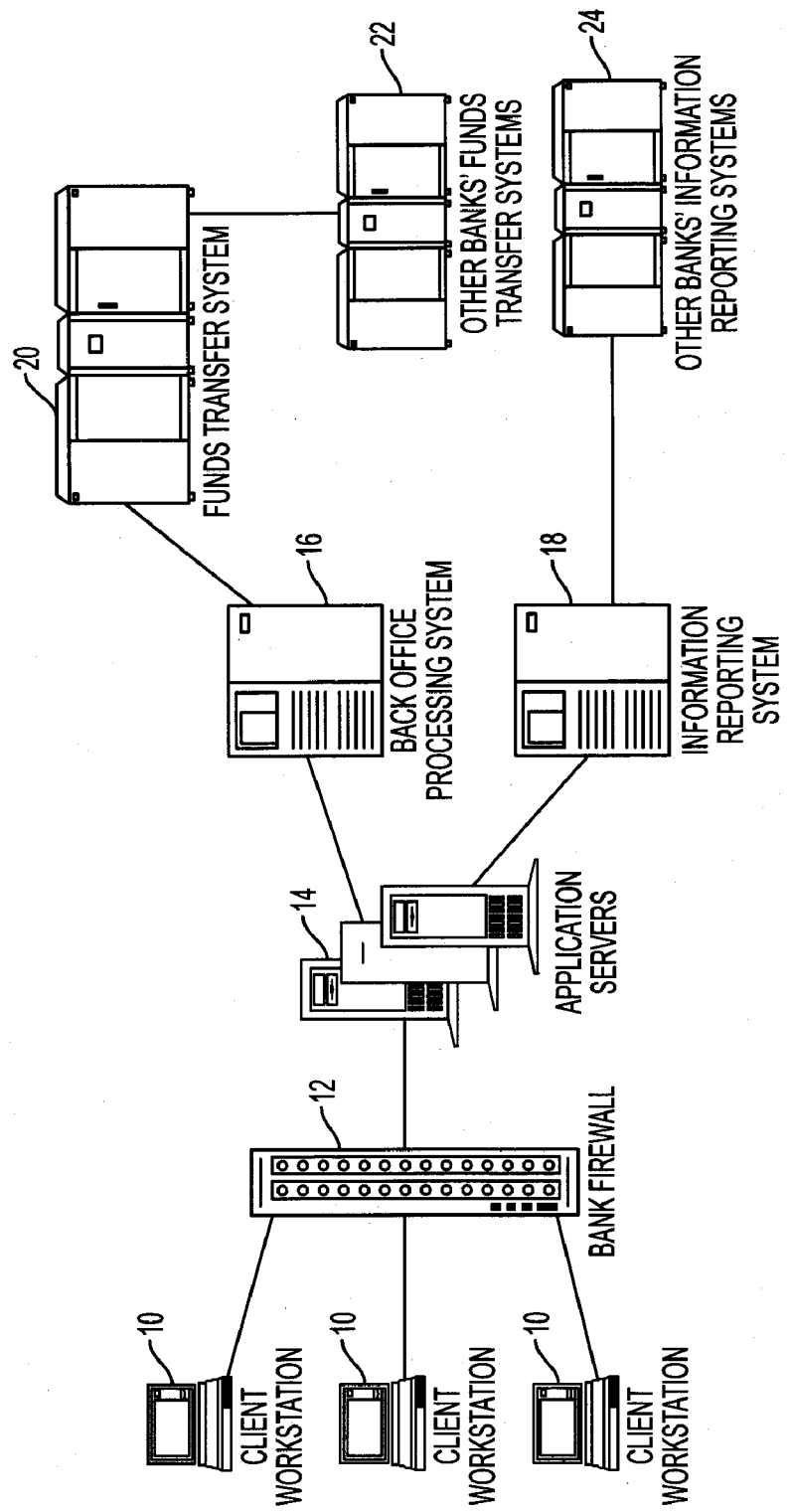
FIG. 1 illustrates a high level systems flow diagram of the present invention.

FIG. 1 is a high level systems flow diagram according to the present invention. Elements 10 represent workstations located at the customer's of the financial institution. Typically these workstations 10 are Personal Computers (PCs) but could also be more advanced graphics workstations or more simple web enabled Personal Digital Assistants (PDAs). The only real requirement is that the workstation 10 is able to connect to the Internet. The workstations connect to the bank through the Internet and through the firewall 12 of the bank. The firewall 12 is a well known security device that prevents unauthorized users from gaining access to the internal bank systems.

Application servers 14 is where the majority of the processing of the present invention takes place. These servers 14 host the applications and databases that are used to the execute certain key aspects of the methods of the present invention. The servers 14 act as the link between the customers workstations 10 and the back office systems 16, 18 and 20 of the bank as well as the systems 22, 24 of other banks. For wire transactions, the back office processing system 16 serves as the front end to the funds transfer system 20. The funds transfer system 20 is conventional in the art and is the means by which the actual instructions for processing a transaction are processed. The funds transfer system 20 communicates these instructions to the funds transfer systems of other banks 22 through, for example, the SWIFT (Society for Worldwide Interbank Financial Telecommunication) system. Although illustrated as two separate components in FIG. 1, the back office processing system 16 and the funds transfer system 20 can be implemented as a single system.

The information reporting system 18 enables the cash reporting features of the present invention. In addition to containing all of the information related to the accounts a customer has at the bank, it also interfaces with the reporting systems 24 of other banks to obtain the customer's account information from those banks as will be further described below.

The wire initiation function of the present invention allows customers of the bank to enter Funds Transfer Transactions (FTTs) that are to be processed by the bank, either for intra-bank transfers or interbank transfers. The FTT entered by the customer can be entered from scratch (freeform) or based upon a set of pre-established details (repetitive lines). The FTTs can request transfers of money in any currency. The system of the present invention further allows the customers to review, approve and release FTTs as well as providing reporting functions with respect to FTTs.

The present invention supports both Domestic Money Transfer (DMT) and Global Money Transfer (GMT). For DMT transfers the following types of transactions are supported: United States Dollar (USD) Drawdown (both Fed and Book); USD Fed; USD CHIPS (Clearing House Interbank Payment System); and USD Book. For GMT transfers, the following types of transactions are supported: TLX (telex); IAT (inter-account transfer); DFT (checks); GIRO (low value payments destined for in-country clearing systems, such as Post Offices); ATR (Advice to Receive) and GMT Drawdowns.

In order to access the functionality of the present invention, the customer merely accesses the bank's servers 14 through the Internet through the bank's firewall 12. This access can be accomplished using standard browser and security techniques. As briefly described above, the access does not have to be from a workstation physically located at the client's location, but can occur from any location through a PDA or other such device.

Figure 2:
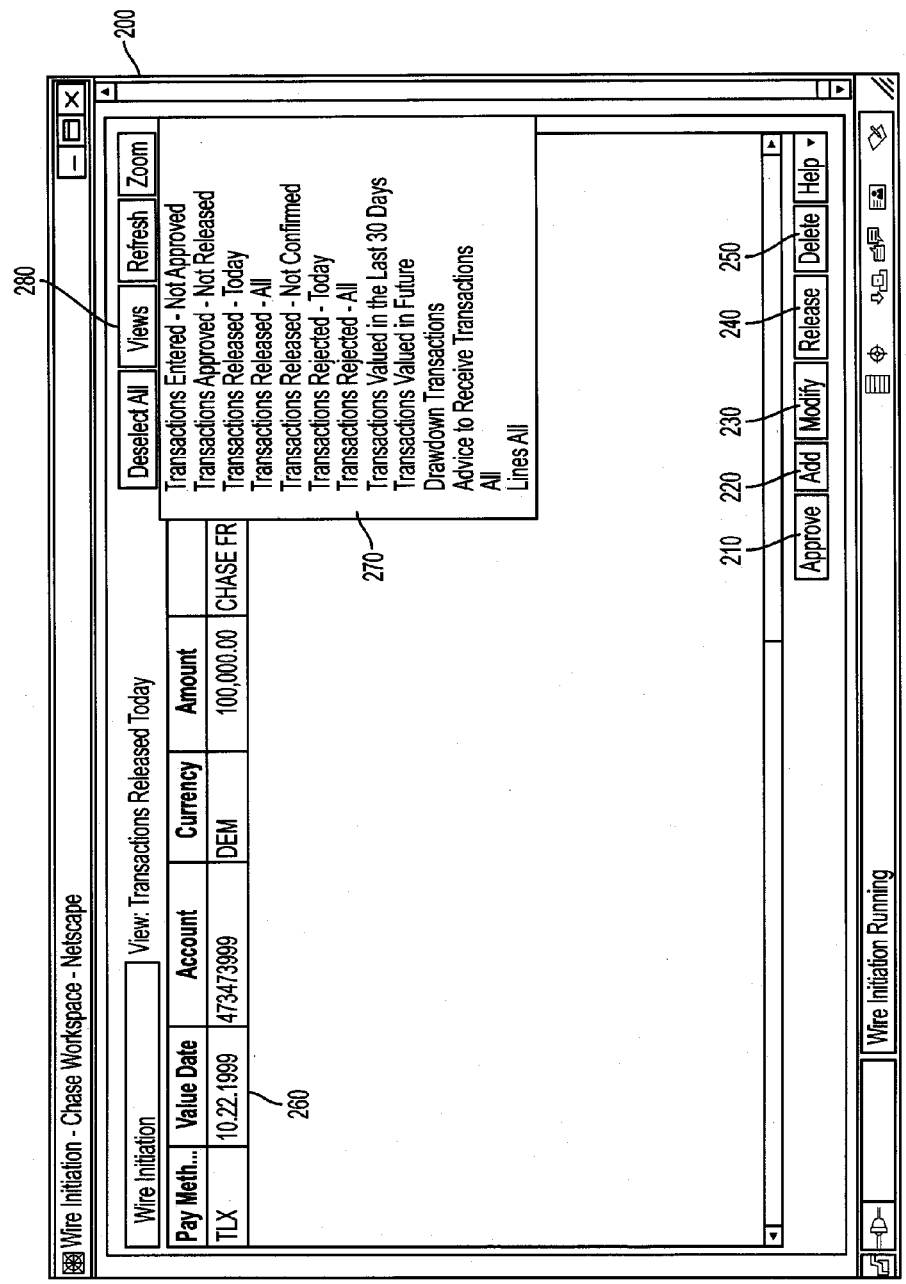
FIG. 2 depicts the summary screen of the system of the present invention.

FIG. 2 illustrates the initial Summary screen 200 presented by the system of the invention once the customer has accessed the system through the Internet. As seen in FIG. 2, user has the option from this initial screen to select the following functional buttons: Approve 210; Add 220; Modify 230; Release 240; and Delete 250. The details of each of these functions is described below. The Summary screen 200 further includes an area 260 in which transactions are listed. The transactions listed are in response to the users selection of a view from the list box 270 generated by the View button 280. When the user selects the View button, she is presented with the list box 270 that includes the various types of transactions which can be viewed and acted upon in area 260.

The type of transaction views selectable from list box 270 include: Transactions Entered—Not Approved view that displays only the transactions with status of Entered for all dates; Transactions Approved Not Released view that displays only the transactions with status of Approved for all dates; Transactions Released Today view that displays only the transactions with the status of Released and a released date of today (note this is not the value date); Transactions Released All view that displays only the transactions with a status of Released across all dates; Transactions Released Not Confirmed view that displays only the transactions with a status of Pending across all dates; Transactions Valued in last 30 days view that displays all transactions that have a value date within the last 30 calendar days; All view that display all transactions; All Lines view that displays all repetitive lines (described below) by entitlements; and Future Value view which displays all transaction of any status where any of the date values are after today's date. Selection of any of these views will cause the transactions fitting the criteria of the view to be displayed in area 260. The view selected in the example depicted in FIG. 2 lists the transactions which have been released today. As seen in area 260, only one transaction was release on this day.

If the user desires to add a new transaction, she selects the Add button 210 on the Summary screen of FIG. 2. This action brings up the Add screen illustrated in FIGS. 3A-3F. In the Add example depicted in FIGS. 3A-3F, the customer is adding a freeform transaction. In a freeform entry of a transaction, the customer must enter from scratch all of the details associated with the transaction (e.g., amount, beneficiary . . . ). In contrast to a freeform transaction, the user has the option to add a transaction based upon a predefined set of transaction data known as a repetitive line. Repetitive lines are used when a customer repeatedly executes a transaction using essentially all of the same transaction details with some minor changes (e.g., the value of the transfer). For example, if a customer consistently pays the same vendor month after month, most of the details of the transaction will not change (e.g., the vendor's bank) other than perhaps the amount of the transaction or the value date of the transaction. In this case, it behooves the customer to set up and save a repetitive line which contains all of the pertinent transaction data associated with the payments to this vendor. The repetitive lines for a customer can be initially established through an electronic download from the customer, manually at the bank from the customer's past history or from information provided from the customer. The customer can furthermore add repetitive lines on an ongoing basis by saving a freeform transaction, created as described below, as a permanent repetitive line.

Transactions are added to the system from the Add screens. The Add screens consists of the sections 300, 324 and 302. The users are able to navigate between the panels 300, 324 and 302 using conventional Graphical User Interface (GUI) techniques. The first section, the Settlement Information Panel 300, consists of settlement type information for that transaction. The second section, Transfer Amount Panel 324, allows the customer to input the value date, currency, amount and details of the instruction. The third section, Payment) Instruction Panel 302, provides a number of subpanels (described below) that allow the customer to input the details of the transaction.

To enter a freeform transaction, the user selects Freeform from the Line No. combo list box 304 in the Settlement Information Panel 300. Selection of the Freeform line indicates to the system that the user want to input a non-repetitive transaction. Alternatively, the user can manually enter "freeform" on the keyboard in the Line# combo box 304. Once the user selects Freeform, the user inputs information from scratch. All the information must be completed in the Settlement Information Panel 300 before the user can go to the Transfer Amount Panel 324 and the Payment Instruction Panel 302 to complete the transaction.

After the user has selected a freeform entry of an FTT, the user must indicate the account involved. To do this, the user can press the Account # Button 306 and select an account from the accounts listed in a pop-up box (not shown). The Account button 306 displays a list of accounts based on user's entitlement. The accounts that a user is authorized to access are contained in a database at the bank and is known as the user's entitlement. The pop-up window displayed from pressing the Account button 306 will display the following data fields: Bank Name; Branch; Account Currency; Account Number; and Account Name. The Accounts can be sorted (ascending/descending) by the data column in the list window. Alternatively, the user can enter the account number directly into the Account number combo box 310 via the keyboard. Input into the combo box 310 is context sensitive to the first character so keyboard entry matches to the lines in the list.

The currency field 308 displays the currency of the account selected as described above. The currency field 308 is a read only field based on account selected and cannot be changed by the user. The Bank Name (ID) field 312 is a read only field which displays the bank name and location for the account selected. The Bank Name 312 is fixed by the account number selected by the user. The bank Line is a read only field which displays the bank line number of the line selected. In the example depicted in FIG. 3A, the user is entering a freeform transaction so this field is depicted as blank. Field 316 shows the name of the account selected by the user while field 318 shows the branch of the bank at which the account is maintained. The bank 312 and branch 318 are tied to the account number 310.

The user can select the type of settlement associated with the FTT as being either Payment 320 or Receipt 322. The default settlement type is Payment 312. The specific method of payment desired by the user is entered in field 324. The allowable payment methods are based on the account number 310 and the Settlement Type (Payment 320 or Receipt 322) that the customer has selected in the Settlement Information Panel 300. If the user indicates that the transaction will be a payment, and if the payment is going to be a DMT type, the authorized payment methods are FED, BOOK or CHIPS. If the payment is a non-DMT, the user must choose TLX, IAT or DFT or GIRO if the transaction is for Asia. If the user indicates a DMT receipt, the payment method must be FED or BOOK. If the receipt is not a DMT, the payment method is either ATR (Advice to Receive) or IAT, or GIRO for Asian transfers.

Below the Settlement Information Panel 300 is the Transfer Amount Panel 324. The Transfer Amount Panel 324 allows the customer to input the value date, transaction currency and amount. The Transfer Amount Panel 324 includes a Value Date field 326 in which the user inputs the value date for the FTT. The format of the date display can be configured as preference by the user. If the user clicks on the Value Date button 328, she will be presented with a calendar that allows the user to easily select a value date for the transaction. The Transfer Currency field 330 displays the currency of the FTT and provides a list of valid SWIFT currencies for selection by the user. The currency list display shows both the currency code and the description. The Transaction Amount field 332 is where the customer inputs the amount of the transaction. The maximum amount allowed for a transaction is the maximum allowed by SWIFT based on the transfer currency. The transaction amount is formatted as the user navigates out of the field 332.

The Payment Instruction Panel 302 for freeform transactions contains the payment routing information for the transaction. The routing information is grouped together identified by the use of tabs which can be selected by the user. Each of the tabs display a different panel that enables the customer to enter the details of the payment instructions. The number and types of tabs selectable by the user and the data content displayed in each tab is based on the back office (derived from account number), settlement type (e.g., payment or receipt) and transaction type (DMT or GMT). Using conventional GUI standards, the tab key on the user's keyboard is used to navigate from one field to the next within each panel. Tabbing from the last field moves to the next block. The user can use the up/down or left/right arrow keys anytime to navigate between the previous/next panels. Within the block of data fields where there are multiple lines of information (i.e., address and reference text) the user cannot skip and leave blank lines. For example, the user is not allowed to leave address line 2 blank and enter data in line 3.

In FIG. 3A, the Summary tab 334 is displayed in the Payment Instruction Panel 302. The panel associated with the Summary tab 334 displays a summary of the details of the transaction. In the example depicted in FIG. 3A, each of the fields displayed is blank since the user in this example has yet to input the details of the payment instructions.

FIG. 3B illustrates the Payment Instruction Panel 302 when the Ultimate Beneficiary tab 336 has been selected by the user. The panel associated with this tab allows the user to input the details of the ultimate beneficiary of the FTT including an identification of the ultimate beneficiary 338, the name of the ultimate beneficiary 340, and the address of the ultimate beneficiary 342.

FIG. 3C illustrates the Payment Instruction Panel 302 when the Beneficiary Bank tab 344 has been selected by the user. The panel associated with this tab allows the user to input the details of the bank used by the ultimate beneficiary of the FTT including the name of the beneficiary bank 346 and the address of the beneficiary bank 348.

FIG. 3D illustrates the Payment Instruction Panel 302 when the Intermediary Party tab 350 has been selected by the user. The panel associated with this tab allows the user to input the details of the intermediary party bank which is going to be involved in the FTT including the name of the intermediary party bank 350 and the address of the intermediary party bank 352. Although some customers do not care which intermediary bank is used, other customers might have a preexisting relationship with a particular bank through which the customer wants the transaction to flow through this particular bank as an intermediary. If these fields are left blank by the customer (the customer does not care about which bank is used as the intermediary) the bank uses a trusted intermediary bank in the transaction. The buttons 354 associated with the Correspondent Charges indicate the party (the remitter or the beneficiary) that is responsible for paying the intermediary party bank charges.

FIG. 3E illustrates the Payment Instruction Panel 302 when the Payment Detail tab 360 has been selected by the user. The panel associated with this tab allows the user to input the details of the payment reflected in the FTT. These fields can be used by the customer much like a memo field on a check. Typically a customer would put in information such as a purchase order number or invoice or other information indicating the purpose of the transaction (see also field 368 on FIG. 3F described below).

FIG. 3F illustrates the Payment Instruction Panel 302 when the Additional Information tab 364 has been selected by the user. The panel associated with this tab allows the user to input additional details with respect to the transaction which the user intends to be read and followed by the bank. As with the information on the Payment Detail tab 360 described above, the information the user puts in this field is not required for the financial processing of the transaction, but allows the customer the opportunity to provide additional information to the bank. Field 368 allows the customer to input its own reference number such as a purchase order number associated with the payment being executed by the transaction.

FIGS. 4A-4E illustrate the tabbed panels for the Payment Instruction Panel 302 for both IAT transactions and GIRO transactions. As seen this these Figures, these type of payment methods differ from TLX transactions in that there is no intermediary party involved in IAT or GIRO transactions. Accordingly, there is no tab for Intermediary Party as was included in the Payment Instruction Panel 302 depicted in FIGS. 3A-3F. Similarly, FIGS. 5A-5D depict the panels associated with the tabs on Payment Instruction Panel 302 for Draft or Check transactions. In these types of transactions there is no beneficiary bank involved, so there is no tabbed panel to enter data for this bank.

FIGS. 6A-6C reflect the tabbed panels of the Payment Instruction Panel 302 which are associated with an Advice to Receive transaction. There are three panels associated with this type of transaction, Summary 400, Debit Account 402 and Debit Bank 410. As seen in FIG. 6B, the Debit Account panel 402 includes a field 404 to input the Debit party and a field 406 for the Address of the Debit party. This panel 402 also includes a customer reference field 408 as previously described. FIG. 6C illustrates the Debit Bank panel 410 which includes fields for the name of the Debit Bank 412 and its address 414. The Debit Account and the Debit bank are the account and bank from which the bank's customer is expecting a payment correct.

FIGS. 7A-7E illustrate an example the screens used by a customer to add a transaction using a repetitive line. The particular example depicted in these Figures relates to a multicurrency/multibank drawdown transaction. As seen in FIG. 7A, the account 306 is denominated in U.S. dollars while the transaction is in Deutschmarks. The basic Add screens for adding repetitive transactions are the same as used for free-form addition of repetitive transactions, namely the Settlement Information Panel 300, the Transfer Amount Panel 324, and the Payment Instruction Panel 302 and its associated subpanels.

To input a repetitive transaction, the customer either types in a repetitive line number in the Line # combo box 304 or clicks on the Line # Button 500. If the user has clicked on the Line # Button 500, a line grid is displayed that contains, in summary form, all lines that the user may utilize to create a transaction. The list of repetitive lines that is displayed is based on user's entitlement. The data columns displayed in the line lookup window are Payment Method, Customer Line Number, Account Number, Ultimate Beneficiary Name, Ultimate Beneficiary Id, Intermediary Party Name, Pay/Rec. The lines can be sorted (ascending/descending) by the data column.

When the user has selected a repetitive line number, either through direct input through the keyboard or through selection from the displayed list, the transaction data related to the line will be displayed in the remaining data fields (e.g., Account Number, Bank ID . . . ). Some repetitive lines will only contain transaction data for certain of the fields and the user has to input the remaining data on the Settlement Information Panel 300. For example, a repetitive line might contain all of the transaction data except for the amount of the transaction, the value date and any additional memo data which the user wants to put in the Additional Information tab 364.

By clicking on the Account Button 306, the user is presented with a list of the accounts which have been preset as being allowed to participate in transactions associated with the selected repetitive line. In essence, the total universe of accounts to which the user has entitlement is filtered by the selected repetitive line. In this manner the user can choose the specific account that is to be involved in the transaction without having to enter the remainder of the data fields from scratch. This concept of filtering also acts in reverse. The user can click on the Account Button 306, select an account, and when she clicks on the Line # Button 500, the user is presented with a filtered list of repetitive lines which can be used with that selected account number. Similar filtering occurs with respect to the settlement type and the payment method.

The remainder of the fields appearing on the Settlement Information panel 300 are the same as previously described with respect to the freeform transactions in regard to FIG. 3A. All of the fields in the Settlement Information Panel 300 must be filled out for the user to proceed to the Transfer Amount Panel 324. Again, the Transfer Amount Panel 324 allows the customer to input the value date and amount of the repetitive transaction. The currency of the transaction is read only and cannot be changed.

As previously described, the user can invoke the calendar to enter a date. The calendar will not show any holiday information, but when the transaction is saved, the present invention checks the value date based on the back office and the transaction currency in order to determine the effect of any holidays. The check is based on whether there is a holiday in the country of the pay currency and whether the debit account owning the branch/back office is on holiday.

As shown in FIGS. 7A-7E, the Payment Instruction Panel 302 for drawdown transactions consists of a Summary Panel 502 (FIG. 7A), a Debit Account panel 504 (FIG. 7B), a Debit Bank panel 506 (FIG. 7C), a Payment Detail panel 508 (FIG. 7D) and an Additional Information panel 510. When using a repetitive line to add a transaction, the data will be predefined for virtually all of the fields contained on these panels. One exception is in the Payment Details panel 508 (FIG. 7D), in which, as previously described, the customer is able to put in information indicating the purpose of the transaction or whatever other information desired by the user.

Once the user is satisfied with the entered transaction, either entered freeform or via a repetitive line, the user can click on the Save button 512 (FIG. 7A) in order to save the transaction. Saving the transaction serves to store the transaction, but not to release (execute it). During the process of saving, the FTT is digitally signed using conventional security measures in order to authenticate the transaction. Once a transaction has been saved, the system assigns it the status of Entered. Once a transaction has status of Entered, it can be approved, modified, deleted or released. Most customers for wire transfers have an internal organization for the approval and release of transactions. Typically, one person will have authority to approve a transaction, while another has the authority to release the transaction. These various authorities are established in the entitlements database previously described.

Transactions that have been entered can be approved, modified or deleted. Any user with the appropriate entitlement may delete a transaction by selecting it on the Summary screen 200 (see FIG. 2) and hitting the delete button. The system will require confirmation of the deletion. In order to approve a transaction, the user selects one or more FTTs from the Summary screen 200 (see FIG. 2) with the status of Entered. The user then clicks on the Approve Button 210. The system then validates the digital signatures of the approved FTTs received during the Add or Modify processes in order to verify the authenticity of the transaction. Once verified, the status of the FTT is changed to Approved and the system updates the Summary screen 200. Once an FTT has been approved, it can be released, deleted or further modified. If a repetitive line was used to create the FTT, and if the repetitive line has since changed, the system prompts the user to approve the new line details. Approved transactions may deleted as described above.

An Entered or Approved transaction can be modified. In order to modify a transaction, the user selects one or more FTTs from the Summary screen 200 (see FIG. 2). The user then clicks on the Modify Button 230. The user can then make changes in the Settlement Information panel 300, the Transfer Amount Panel 324, and the Payment Details panel 508 (see FIG. 3A). For repetitive transactions, the user can only modify the value date, the amount and the payment details. If the user want to make other modifications to a repetitive transaction, the user must add a new transaction. When finished with the modification, the user saves the transaction which then has a status of Entered, just like a new transaction. Once a transaction has been modified, it must be approved before it is released.

In order to release a transaction, the user selects one or more FTTs from the Summary screen 200 (see FIG. 2) with the status of Approved. Only an Approved transaction can be released, and transactions with a value date which has passed cannot be released. The user then clicks on the Release Button 240. The system then prompts the user a password. If the password is accepted, the system then validates the digital signatures of the FTTs to be released and digitally authenticates FTTs and releases them to the back office systems 16, 20 of the bank (See FIG. 1) for processing. The user is notified of any FTTs whose digital signature was not validated or whose entitlement limits were not met (e.g., the amount of the transaction exceeded predetermined limits in the entitlements). Once a transaction has been released to the back office systems 16, 20 of the bank, its status is changed to Pending. When the back office systems 16, 20 of the bank issue a control number, the status of the FTT is changed to Released. The control number is used by the customer and the bank to track the status of the FTT through the SWIFT system and the funds transfer systems 22 of other banks (see FIG. 1).

As previously described, customers can use the wire transfer facility of the present invention through a single bank to effectuate a transfer of funds from a second bank to a third bank. The funds do not have to originate with the bank hosting the system of the present invention. For example, if bank A is the host for the system, a customer can log onto the system at bank A, create an FTT which transfers funds from the customer's account at bank B to an account at bank C. To accomplish this, once created, approved and released, the transaction is forwarded from the funds transfer system 20 (see FIG. 1) of bank A to the funds transfer system of bank B which processes the FTT by transferring the funds to the designated account at bank C. Bank B will honor the FTT if the customer has previously arranged with its bank B to accept electronic transfer instructions (SWIFT messages) from bank A. In this manner, a customer can use the single simple interface of the present invention to accomplish all of its wire transfer needs without all of the difficulties described above of having to communicate separately with all of the banks at which it maintains accounts.

The other significant functionality of the present invention is the cash reporting function. This portion of the system allows the customer to view most details of any account it has through the use of the Internet and the single consistent interface of the present invention. As with the wire initiation function, the advantages of the cash reporting function of the present invention is that eliminates the need for the customers to establish separate communications with their different banks, maintain separate software packages, remember separate user id/password, deal with a variety of security devices, pay for separate software licenses, learn to use different transaction input screens, and the inefficiency of handling separate transaction databases.

Figure 8:
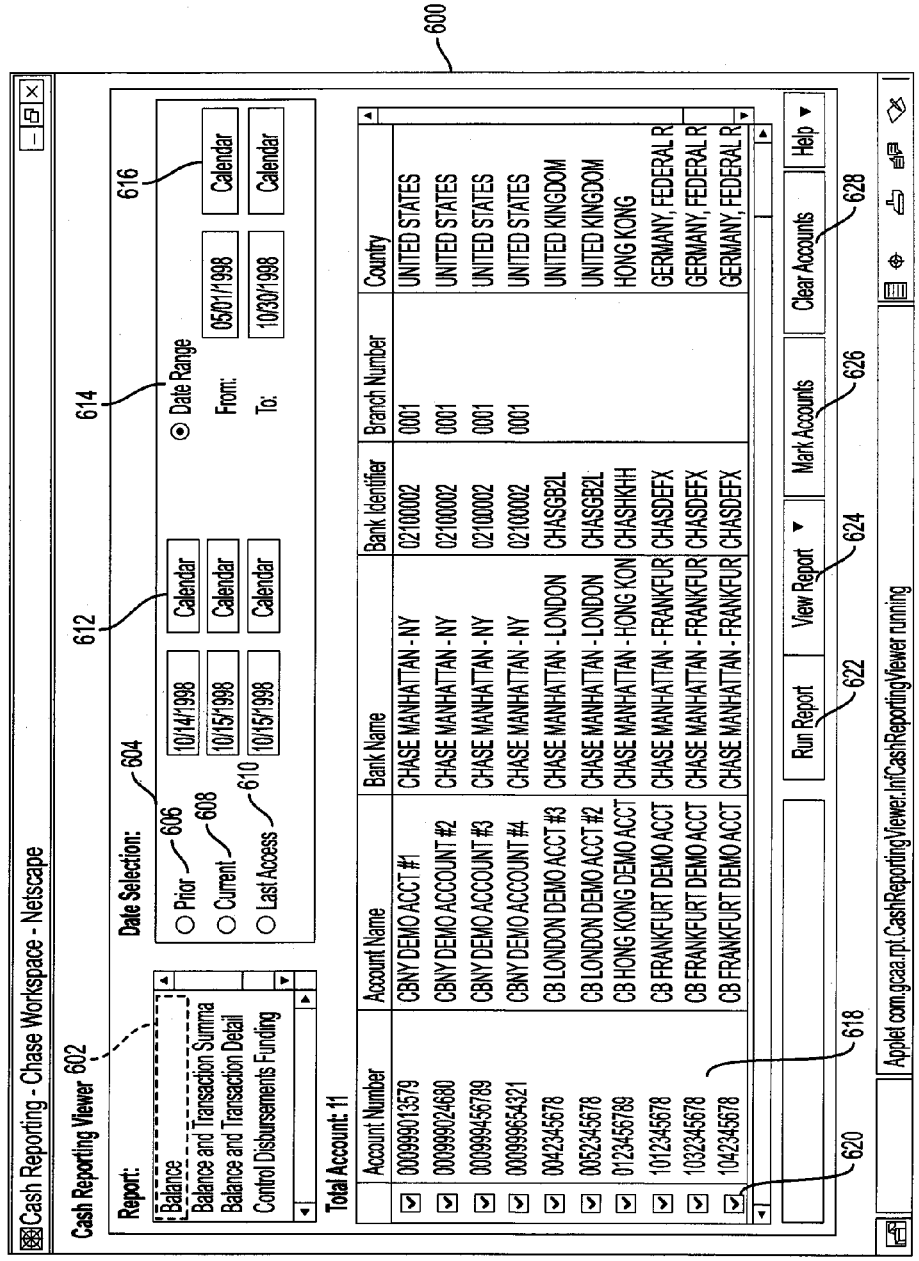
FIG. 8 depicts the main screen of the Cash Reporting viewer of the present invention.

The main screen 600 of the cash reporting viewer is illustrated in FIG. 8. Area 602 displays a list of all of the reports which are available for the user to run. Although any types of reports could conceivably be generated, in a preferred embodiment of the present invention there are eight different reports including: a simple Balance report; a Balance and Transaction Summary report that summarizes the transactions for the selected time period; a Balance and Transaction Detail report includes the details of the transactions for the selected time period; Checks Paid Ascending Dollar; Checks Paid Descending Dollar; Control Disbursements Funding; Lockbox Detail; and Lockbox Summary.

In area 604, the customer selects the relevant time frame for the report. If the user selects the radio button Prior 606, the time frame for the report will be from the previous day. Selection of the radio button Current 608 causes the report in include the balance and or activity from the current day, while the Last Access radio button 610 generates a report from the date of the last report run by the customer. The text boxes next to the radio buttons 606-610 allow the user to see the date of the information which the report will include, while the calendar buttons 612 allow the user to quickly select a date. The calendar buttons 612 are necessary even for single day reports to allow the customers to adjust for time zone changes in global operations.

As an alternative to the Prior, Current and Last reports, the customer can select radio button 614 in order to generate a report with a user defined date range. The user inputs the desired date range into the From and To text boxed appearing below the Date Range radio button 614. Again, calendar buttons 616 are included to allow the customer to quickly select a date. The date range selection is available for all of the reports.

The accounts from which the customer can generate reports are listed in area 618 of the screen. The accounts are identified by the Account Number, Account Name, Bank Name, Bank Identifier, Branch Number and the Country of the Bank. The entitlement database previously described contains the list of account which the particular user is allowed to view. Only the accounts to which the user is entitled are listed in area 618. Although in the example depicted in FIG. 8, area 618 only lists accounts from a single bank, Chase Manhattan, the user is able to view the details from any of its accounts at other banks provided that the other bank has supplied the host of the present invention with account information.

As discussed with respect to FIG. 1, The present invention provides a link from the information reporting systems 24 of the host bank to the reporting systems 18 of any of the other banks at which the customer hold accounts. Through this link, the other banks supply the reporting system 24 of the host bank with files containing the account information for customers. The customer must have previously requested and authorized the other banks to provide this information to the host bank. The data from the other banks is reformatted in the information reporting system 24 in order to be consistent with the data from the in-house accounts contained on reporting system 24. As previously described one significant aspect of the cash reporting feature of the present invention is that it provides the customers with a consistent user interface and reports, regardless of the source of the account data.

The check boxes 620 allow the customer to select the accounts on which reports to be generated. Once the user has selected the accounts, she can select the Run Report button 622 to generate the reports and the View Report button 624 in order to view the reports. The View Report button 624 will present the user with the list of reports which have been run and stored in the last five days that can be viewed by the user.

The Mark Account button 626 allows the user to select all of the accounts listed in area 618, while the Clear Accounts clears all of the user's selections.

FIG. 9A through FIG. 13 illustrate some sample of the account reports generated by the present invention. FIGS. 9A-9D depict a Balance and Transactional Detail report for the current day (the day the report is being run). This report includes all of the details of the transactions which have been processed (not necessarily posted) for the current day. As seen in FIG. 9A, the report includes the transactional data for a given account number 700. Section 702 of the report includes a summary of the account activity, and the reporting of the credits to the account starts at point 704 on the report. The entries contained on the bottom of FIG. 9A through the top of FIG. 9C are the details of the credit transactions with respect to the account. The total credits to the account is listed at 706 on FIG. 9C. The reporting of the debit transactions begins at 708 on FIG. 9C and continues through the bottom of FIG. 9D. At the bottom of FIG. 9D at 710 is listed the total debits for the account. This report accordingly give the customer a detailed representation of all of the activity with respect to the listed account for the current day's activity.

FIGS. 10A-10G provides a similar Balance and Transaction Detail for the Prior day's activity, except that these Figures include the account details for two different accounts on the same report. FIGS. 10A-10C illustrate the details of the prior day's transaction for a first account 720, while FIGS. 10D-10G illustrate the details for a second account 722 (see FIG. 10D). It is therefore clearly shown that the present invention is able to produce, in a single report, the detailed account activity with respect to several account from several different banks. Although not shown, a similar Balance and Transaction Detail report can also be generated for the Last Access and Date Range time periods.

FIGS. 11A-11C illustrate a sample Summary report generated by the present invention. The time frame for this particular report is from the Last Access by the Customer. Similar to the Detail reports described above, the Summary report includes a summary section 730 that summarizes the credits and debits to/from the account. Starting at section 732 each of the credit transactions are listed in summary form as opposed to the detailed format depicted in FIGS. 9 and 10. The summary of the debits begins at 734 on FIG. 11B. This summary format provides the customer with a list of all the transactions without the detailed information included in the other reports. In reviewing the Summary report, if the customer need to see the details of a transaction, the Detailed report can be run. In section 736, the Summary report concludes with a complete summary of the balances, total credits and total debits. Although not shown, similar Summary reports can be generated for Prior, Current and Date Range time frames.

FIG. 12 depicts a Balance report for the Prior day. This report does not include any of the transaction details or summaries as is used in the previously described reports. As with the other reports, the Balance report can be generated for the Current, Last Access and Date Range time frames. FIG. 13 is a report generated with respect to a Demand Deposit Account (DDA). This report lists the details with respect to the account activity, namely the checks posted against the account. This particular report lists the checks in descending order. A separate report (not shown) lists the checks in ascending order.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A system for receiving and processing funds transfer transactions from a customer of a first bank, the system being operated primarily by or for the first bank, the system comprising:

an application server hosting an Internet site application processor, wherein a customer of the first bank is able to access the Internet site application processor through a standard Internet browser without any client-side banking software, the Internet site application processor further comprising a reporting application processor for receiving and storing at the first bank the customer's account information at a second bank, thereby allowing the customer to generate and view a report regarding the customer's accounts at both the first and the second banks without establishing a separate communication with the second bank;

a plurality of user input screens contained in the Internet site application processor, the user input screens accepting input information with respect to at least one funds transfer transaction from the customer;

a back office processor coupled to the application server, the back office processor receiving the input information from the application server, generating a funds transfer instruction in response to the received input information, the funds transfer instruction to be carried out by the second bank; and transferring the funds transfer instruction from the first bank to the second bank via a link between the first bank and a second bank, wherein a back office processor of the second bank executes the funds transfer instruction by transmitting the funds to a third bank.

2. The system according to claim 1, wherein the at least one funds transfer transaction involves transferring funds from a first account at the second bank to a second account at a third bank, and wherein the back office processor transmits the funds transfer instruction to the second bank whereby the second bank subsequently transmits the funds to the third bank.

3. The system according to claim 1, wherein the user input screens further comprise:

input fields for accepting a pointer to a repetitive line and an amount of the funds transfer transaction, the repetitive line containing predefined details relating to the funds transfer transaction, wherein the back office processor generates the funds transfer instruction using the repetitive line and the amount.

4. The system according to claim 1, wherein the user input screens further comprise:

input fields for accepting:

account information describing the account to be debited, ultimate beneficiary information describing the ultimate beneficiary of the funds transfer transaction, beneficiary bank information describing the bank of the ultimate beneficiary of the funds transfer transaction, intermediate bank information describing an intermediary bank involved in the funds transfer transaction, and payment detail information describing details relevant to the customer regarding the funds transfer transaction.

5. The system according to claim 4, wherein the application server saves and stores the input information as a repetitive line and wherein the repetitive line can be used for subsequent funds transfer transactions.

6. The system according to claim 1, wherein the at least one funds transfer transaction requests a transfer of funds from a first account at the first bank to a second account at the first bank, the back office processor executing the funds transfer instruction by transferring the funds from the first account to the second account.

7. The system according to claim 1, wherein the at least one funds transfer transaction requests a transfer of funds from a first account to a second account and where in the accounts are in two different currencies.

8. The system according to claim 1, wherein the report includes a report on a balance of the accounts, a report on transactions conducted with respect to the accounts, a control disbursements funding report and a lockbox report.

9. The system according to claim 1, wherein the Internet site application program further comprises a security application, the security application verifying the customer's authority to enter, modify, approve and release funds transfer transactions.

10. The system according to claim 9, wherein the security application authenticates funds transfer transactions.

11. The system according to claim 9, wherein the customer has multiple users, and wherein the security application verifies the user's authority to enter, modify, approve and release funds transfer transactions.

* * * * *